US005385771A

United States Patent [19]

Willetts et al.

[11] Patent Number: 5,385,771

[45] Date of Patent: Jan. 31, 1995

[54] OUTDOOR POSTER GRADE ELECTROGRAPHIC PAPER

[75] Inventors: Carl V. Willetts, Penenden Heath, United Kingdom; Cynthia F. Klausner, Hadley; Donald A. Brault, Granby, both of Mass.; Bryan W. M. Crosbie, Whitstable, United Kingdom; Alan F. Stewart, Pelham; Dene H. Taylor, Holyoke, both of Mass.

[73] Assignee: Rexham Graphics Inc., So. Hadley, Mass.

[21] Appl. No.: 58,259

[22] Filed: May 10, 1993

[51] Int. Cl.[6] .............. B32B 3/00

[52] U.S. Cl. .............. 428/211; 428/195; 428/412; 428/478.8; 428/481; 428/495; 428/511; 428/688; 162/164.1

[58] Field of Search .............. 428/514, 195, 204, 206, 428/219, 411.1, 913, 211, 412, 478.8, 481, 496, 688, 511; 524/555; 430/63; 162/38, 164.1; 427/121

[56] References Cited

U.S. PATENT DOCUMENTS

| | | | |
|---|---|---|---|
| 3,653,894 | 4/1972 | Levy et al. | 96/1.7 |
| 3,861,954 | 1/1975 | Funderburk | 117/218 |
| 3,946,129 | 3/1976 | Jones | 428/304 |
| 4,210,489 | 7/1980 | Markofsky | 162/164 R |
| 4,919,757 | 4/1990 | Ohmae et al. | 162/164.3 |
| 4,980,238 | 12/1990 | Ohmae et al. | 428/514 |
| 4,997,895 | 3/1991 | Ohmae et al. | 524/555 |
| 5,130,177 | 7/1992 | Lu et al. | 428/195 |

*Primary Examiner*—Patrick J. Ryan
*Assistant Examiner*—William A. Krynski
*Attorney, Agent, or Firm*—Burns, Doane, Swecker & Mathis

[57] ABSTRACT

Provided is an electrographic printing paper suitable for the printing of a quality image, which printing paper is pastable and is therefore useful in pastable displays, including outdoor billboards. The electrographic printing paper is comprised of a dielectric coating on a conductive base paper which exhibits wet strength and wet expansion properties suitable for pasted displays. The conductive base paper contains a wet strength agent and a sizing or coating of a conductivizing composition comprised of a binder and a substantially water insoluble conductivizing agent.

33 Claims, No Drawings

OUTDOOR POSTER GRADE ELECTROGRAPHIC PAPER

BACKGROUND OF THE INVENTION

This invention relates to a medium for electrographic printing which yields quality images and which comprises a paper substrate having sufficient wet burst strength such that the electrographic medium is suitable for outdoor use. In still another aspect, the present invention relates to pasted displays, and in particular outdoor signs, made with the electrographic medium of the present invention.

The use of electrographic processes is well known in the art. In these processes, the electrostatic latent image is produced directly by "spraying" a charge onto an accepting dielectric surface in an imagewise manner. Styli are often used to create these charge patterns and are arranged in linear arrays across the width of the moving dielectric surface. These processes require an apparatus as described, for example, in U.S. Pat. Nos. 4,007,489; 4,569,584; 4,731,542; 4,808,832; and European Patent Publications 444,870 and 437,073, the subject matter of which is hereby incorporated by reference.

The use of electrographics to generate images suitable for use on billboards and other outside exhibitions is also known to the art. For example, European Patent Publications 444,870 and 437,073 disclose processes for making large size, full color images by electrographic means. The processes described in the foregoing European patent publications involves transferring an image from an imaging sheet to a separate receptor sheet. The receptor sheet is selectively chosen to have the required properties for a final print useful for outdoor signing. The transfer to a final imaging sheet was found necessary in order to overcome the problems that typical paper substrates have in the electrographic art, i.e., a lack of water and UV resistance necessary for outdoor signing.

Indeed, electrographic imaging has not been a viable imaging technique for the outdoor market because the papers available cannot withstand either the pasting techniques currently used or outdoor weather conditions for extended periods of time. Insufficient wet strength of the current electrographic papers causes the paper to tear during pasting. Furthermore, separation of the dielectric layer from the conductive layer often occurs upon application of pasting solutions.

As a result, the current outdoor market is presently being served predominantly by silk screen, lithography, and manual or mechanical painting techniques. Such methods are slow and very uneconomical, particularly for short run (1 to 10 runs) printing. Direct imaging on water insensitive electrographic film has been found feasible, but such material is unsuited for mounting by the typical methods employed in the outdoor market industry. Imaging directly onto fabrics for such applications has been proposed, for example, see Japanese Patent Application 21-18665, but the materials used have insufficient opacity.

Accordingly, there is a real need in outdoor signing and other posting applications, for a weatherable, pastable electrographic medium which provides high image quality if electrographic imaging is to be useful. It would be advantageous to develop such a pastable paper substrate since electrographic imaging can quickly and economically print individual billboards provided the paper substrate does indeed meet the wet strength (and wet expansion) requirements necessary.

It is therefore an object of the present invention to provide a novel electrographic medium which is pastable and which provides high quality imaging.

Yet another object of the present invention is to provide one with an electrographic medium having sufficient coating adhesion of the dielectric layer, as well as wet expansion and wet strength properties, to withstand aqueous pastes and outdoor conditions and thereby provide an excellent medium for outdoor signing.

It is still another object of the present invention to provide one with a process for making a posterboard useful as an outdoor sign by electrographic imaging, which posterboard overcomes the problems of the prior art.

Yet another object of the present invention is to provide one with a novel pastable display medium having high image quality, which image has been printed by electrographic means.

These and other objects of the present invention will become apparent upon a review of the following specification and the claims appended thereto.

SUMMARY OF THE INVENTION

In accordance with the foregoing objectives, the present invention provides an electrographic printing paper suitable for the printing of a quality image, which printing paper is pastable and provides good weatherability and is therefore useful in pastable displays, including outdoor billboards. The electrographic printing paper is comprised of a dielectric coating on a conductive base paper which exhibits wet strength and wet expansion properties suitable for pasted displays. The conductive base paper contains a wet strength agent and a sizing or coating of a conductivizing composition comprised of a binder and a substantially water insoluble conductivizing agent.

In another embodiment of the present invention, there is provided an imaged electrographic medium which has a sufficient wet strength to withstand pasting, sufficient wet expansion to be useful in pasted displays and exhibits no delamination of the dielectric layer in water. Accordingly, the imaged electrographic medium finds useful application in pasted displays, such as wallpaper, murals, indoor and outdoor signs.

In another embodiment of the present invention, there is provided a process for making a pastable display such as an outdoor sign. The process involved employs the imaged electrographic medium of the present invention, and applies same to an outdoor structure, such as a billboard.

DETAILED DESCRIPTION OF THE PREFERRED EMBODIMENTS

The electrographic printing medium of the present invention is comprised of a dielectric coating on a conductive base paper which exhibits a wet strength and wet expansion suitable for pasted displays. While exhibiting such wet properties, the electrographic printing paper still permits one to print a high quality image.

The conductive base paper of the electrographic printing paper contains a wet strength agent, and a sizing or coating of a conductivizing composition comprised of a binder and a substantially water insoluble conductivizing agent. The wet strength agent can be any suitable wet strength agent, with suitable, conventional wet strength agents being well known. Among such conventional wet strength agents are polymers or copolymers of polyamides, polymers or copolymers of polyamines, ureaformaldehyde resins, and melamine-formaldehyde resins. Among the most preferred wet strength agents is a copolymer of a polyamide and epichlorohydrin. Such suitable copolymers are well known and are commercially available, for example, under the trademark Kymene from Hercules plc.

It has been found that the incorporation of such a wet strength agent into a conductivized base paper to be used in an electrographic printing medium yields a paper having sufficient wet strength properties to withstand the application of aqueous pastes and outdoor conditions such as those encountered when preparing an outdoor sign. The wet strength of the paper, expressed in terms of wet burst strength, is generally that of at least 50 kPa and is generally in the range of from about 50 to about 100 kPa. Such a wet burst strength would preclude the paper from tearing during pasting techniques, such as those currently used for the preparation of outdoor signs.

The wet strength agent is preferably added as a stock addition to the furnish of the paper. It is preferred that the wet strength agent be added early in the papermaking process, e.g., in the wet end, to give the wet strength agent time to attach itself to fibers being incorporated into a sheet as the sheet forms. The polyfunctional molecules react with the exposed hydroxyl groups of cellulose by primary valence bonds. Since the wet strength agents are highly cationic, care must be taken, however, that they are not added at a point in the papermaking process where they will react with an anionic additive or have to compete with another cationic additive for attachment sites on the cellulosic fibers.

The amount of wet strength agent introduced into the base paper is sufficient to achieve a wet burst strength of at least 50 kPa. The requisite amount will vary depending upon the particular furnish involved and other additives. However, in general, the amount of wet strength agent added is in the range of from about 10 to 25 kg per tonne of fiber.

It is also preferred to include in the paper a filler or opacifying agent such as titanium dioxide, carbon black, clay or other known agents. Titanium dioxide is the most preferred opacifying agent. Inclusion of such opacifying agents permits the paper base to be opaque and thereby more useful in outdoor signs, wallpaper, or other applications where an imaged medium is to cover an existing structure. Preferably, the base paper has a dry opacity, measured by the method Tappi T 425 os-75, of at least 90%, e.g., between 90 and 97%, and a wet opacity of at least 83%, e.g., between 83 and 94%. The wet opacity is measured, by soaking a sample in water (20° C.) for 15 minutes, blotting and then measuring as for dry opacity.

Other conventional additives may be included in the paper, such as extenders, retention aids, and sizing agents. All such agents are conventional and are well known in the art.

The base "paper" of the present invention is preferably made primarily of cellulosic fibers, such as wood fibers. The base paper can also contain, however, synthetic fibers, such as polyester fibers, and other natural fibers such as cotton fibers. Generally such synthetic or other fibers are present in a minor amount relative to the cellulosic fiber.

The cellulosic fiber employed in the base paper can be any standard or conventional cellulosic fiber used to make paper sheets, and is preferably a wood fiber. Generally, the fiber is a weakly beaten fiber. Use of the weakly beaten fiber is particularly advantageous when the paper is to be ultimately used for billboard panels in order to ensure that the billboard panels match. It is preferred that the paper be beaten only to an extent such that the paper exhibit dimensional stability in terms of a wet expansion of the paper of less than 3%, more preferably less than 2%, and most preferably less than 1.5%.

Once the furnish has been made, the wet strength agent, e.g., polyamide-epichlorohydrin copolymer, can be added to the furnish prior to dewatering the furnish on a screen to form the paper web. The paper can be made on conventional paper making machines, including a size press or size bath. The basis weight of the resulting paper can vary greatly, but is preferably in the range of from about 80 to about 160 g/m$^2$. The paper can also be calendered to increase the smoothness and decrease the porosity of the base. The increased smoothness of the base paper generally results in a smoother image when employed in electrographic imaging. Too severe calendering, however, can result in a paper having transport problems through a printer. It can also affect the opacity of the paper.

The base paper containing the wet strength agent is then generally coated or sized with a conductivizing composition. The conductivizing composition of the present invention comprises a binder and conductivizing agent which is substantially insoluble in water. Use of such a conductivizing composition has been found to ensure that any subsequently added dielectric coating adheres to the base through the pasting technique and all weather conditions. Use of a conductivizing agent which may partly dissolve in water might result in migration of the conductivizing agent into the dielectric coating, thereby reducing the effectiveness of the dielectric coating, while also impairing the adhesion of the dielectric coating to the base. As a result, delamination would result during pasting techniques. However, by employing a conductivizing composition comprising substantially water insoluble conductivizing agents in accordance with the present invention, this problem is overcome.

The conductivizing composition generally comprises an electroconductive fine powder as the conductivizing agent. Suitable electroconductive powders include synthetic hectorite clay, bentonite clay, carbon black, graphite, tin oxide, zinc oxide, and antimony oxide. Of the foregoing, the use of synthetic hectofite clay, which is commercially available from Laporte plc. under the trademark Laponite S, is the most preferred due to the excellent results observed. The most preferred synthetic hectorite clays are those described in U.S. Pat. Nos. 4,868,048 and 4,739,003, the subject matter of which is hereby directly incorporated by reference.

It is generally preferred that the conductivizing composition also include a binder in addition to the electroconductive fine powder. Samples of suitable binders include aqueous styrene/butadiene lattices, aqueous acrylic polymer emulsions, aqueous acrylate/styrene copolymer dispersions and aqueous poly(vinylidene chloride) suspensions. The presence of the binder creates a matrix for the electroconductive material, and can avoid dusting when the electroconductive material is a fine powder.

The conductivizing composition may be applied by conventional web coating methods. In the case of paper, the clay/binder admixture may conveniently be incorporated in the paper web by application at the size press or size bath of the paper machine on which the paper to be conductivized is produced. The treated clay suspension may typically have a clay content of about 10 to 15% by weight. The pickup from the size press or bath should typically be within the range of 2 to 4 grams/m$^2$ on a dry basis, for a treated clay suspension of about 11% solid content, but this will of course depend on the degree of conductivity desired, the paper making and coating conditions, and the treated clay content of the mix. If it is desired to apply more conductivizing agent than can conveniently be applied in a single coating operation, particularly a size press or size bath operation, the web may be given a second pass through the coating station to apply additional conductivizing composition.

It is generally desired that the conductivizing composition be applied as a coating such that the surface resistivity of the conductivized paper be between 0.5 and 50 Mohm/sq., more preferably between 1 and 10 Mohm/sq., and exhibit a volume resistivity of between 90 and 500 Mohm.cm. This type of conductivity results in the medium being excellent for electrographic printing.

To produce an electrographic imaging paper, a dielectric coating is applied to the conductivized paper described above. The dielectric coating is conventional in nature, and may comprise a polymeric material in the form of a resin or latex. The polymeric material may comprise, for example, polyvinylbutyral or a homopolymer or copolymer of vinyl acetate, vinyl chloride, vinylidene chloride, an acrylate, a methacrylate, acrylonitrile, ethylene, styrene, butadiene, or more generally can be any typically used polyester, polyacrylic, polycarbonate, polyamide, polyurethane, styrene or olefin resin, or a mixture thereof. It is preferred that the dielectric coating comprise polyvinylbutyral, a polyacrylic or a mixture thereof. A dielectric coating also generally employs a pigment such as, for example, clay, calcium carbonate, silica or a synthetic aluminasilicate. Optionally, a dispersant for the pigment material may be included in the dielectric material. The pigment is conventionally included to provide the necessary spacer particles and abrasivity for electrographic imaging. The proportion of pigment used may likewise be conventional, for example, the pigment may constitute from 10 to 75% by weight of the dielectric coating, on a dry basis.

The dielectric coating may be applied in a solvent vehicle as is conventional in the art. Alternatively, the dielectric coating may even be applied as an aqueous dispersion. Conventional coating techniques may be employed for the application of the dielectric coating. For example, blade coating, reverse roll coating, Meyer bar coding or offset gravure coating can be used. The coat weight applied is typically within the range of from 3 to 10 grams/m$^2$.

The resulting electrographic paper can be imaged using conventional electrographic printers. Conventionally available printers are those made by Xerox Engineering Systems, Calcomp, Raster Graphics Inc., and Synergy Computer Graphics Corp. Such printers generally comprise a number of printer stations which contact the imaging surface in sequence as follows:

a stylus or electrostatic imaging bar by means of which an electrostatic image is produced on the dielectric surface imaging sheet as it moves past the station, a liquid toner developing device incorporating an application system to deposit toner on the latent image, and a drying system to remove the solvent present in the imagewise deposited toner.

Such printers have been used in the art in a mode whereby the toner image is permanently fixed to the dielectric imaging sheet surface. They have been shown in the art to be particularly applicable to the making of large size prints. Imaging surface webs from 3 feet to 4 feet 6 inches in width and of substantially unlimited length are known to have been produced.

The toners used are conventional toners, except that when the imaged medium is to be used outside, the toner should be UV stable and weather resistant. Therefore, when a medium for outdoor use is being prepared, the toners employed are conventional UV stable and weatherable toners such as those available from Specialty Toner Corporation of Fairfield, N.J. and Hilord Chemical Corporation of Hauppage, N.Y., who both sell suitable toners. In applications where the imaged medium would be used, e.g., indoor signage, wallpaper, the necessity for using UV stable toners does not exist.

Once the electrographic medium has been imaged, it can be prepared for use in its end application. If the medium is to be used on an outdoor posterboard or outdoor billboard, then the imaged medium would eventually be soaked in a pasting solution or at least brushed on the backside with a pasting solution and applied to the outdoor structure. More specific, preferred applications include small outdoor posters, for example, eight-sheet or junior panels, usually 6 feet by 12 feet, and medium outdoor posters, for example, 30 sheet posters, typically 12 feet by 25 feet. If the end application was custom wallpaper, then a dry paste, subsequently moistened, can be applied to the backside or a wet paste could be applied immediately prior to applying the wallpaper to a wall.

The present invention, therefore, provides an electrographic paper medium which can provide a quality image by means of electrographic printing. The conductivized paper base exhibits a surface resistivity of from 1-10 Mohm/sq., and it readily accepts a dielectric layer. The quality image is also characterized by a density of at least 1.0, and preferably at least 1.2 or greater for black. As well, the image generally has no visibly objectionable patterns such as grain and mottle. The image also has high color uniformity, in the image itself, as well as from panel to panel in a poster. Yet, the electrographic paper medium of the present invention is also pastable in that it exhibits sufficient wet strength to be weatherable and withstand pasting, e.g., a wet strength of at least 50 kpa, and has a low wet expansion, less than 3%, or preferably less than 2%. Furthermore, the electrographic paper medium exhibits no delamination of its dielectric layer in water, thereby permitting its use with conventional pasting techniques. A combination of such wet properties with printability of the paper by electrographic means to give a quality image has heretofore not been seen in electrographic papers. The opacity of the paper can also be greater than 90%, or even 95% if desired. This permits use of the imaged paper over previously existing displays. The present invention, therefore, fills a void in the technology for quality pastable displays, specifically made by electrographic means.

The invention will be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLE 1

A furnish was made comprising 400 kg softwood kraft pulp, 500 kg Eucalyptus pulp, 200 kg titanium dioxide, 10 kg of a cationic starch useful as a retention aid available as Solvitose PLV (trademark of Avebe UK Ltd.), 25 kg talc, available as Mistron 775 (trademark of Cyprus Industrial Minerals Corporation) useful as a titanium dioxide extender and pitch control agent. To the furnish was added as stock addition an alkylketenedimer as a neutral sizing agent available as Aquapel 360 (tradename of Hercules PLC) at a rate of 40 liters of 7½% solution per ton of paper, and a polyamide-epichlorophydin copolymer available as 12½% solution as Kymene 557H (trademark of Hercules PLC) at a rate of 80 liters per ton of paper. The pulp was dispersed and refined at low load in order to achieve a low degree of wet expansion. Refining was carded out to a freeness aim of 9 degrees Schopper-Riegler.

The furnish was passed onto the wire of a Fourdrinier papermaking machine in order to form a fibrous web. The fibrous web was then sized by application of the following aqueous conductivizing mixture on both faces of the paper:

synthetic hectorite, available as Laponite S (trademark Laporte PLC); tetrasodium pyrophosphate (useful as a peptiser); and acrylic emulsion as a binder.

Concentration of this conductivizing composition was varied to achieve the desired resistivity in the range from 3 to 10 Mohm/sq. in the machine direction. The web was calendered to achieve desired smoothness.

The resulting conductivized base exhibited the following characteristics:

| | |
|---|---|
| Basis weight (g/m²) | 98.2 to 101 |
| Burst strength (kPa) | 245 to 325 |
| Wet burst strength (kPa) | 82 to 99 |
| Opacity (%) | 86.2 to 87.6 |
| Wet opacity (%) | 75.9 to 78.8 |
| Resistivity surface (Mohm/sq) | 5.0 to 6.2 |
| Resistivity volume (Mohm·cm) | 110 to 160 |
| Wet expansion (%) | 1.7 to 2.2 |
| Bendtsen smoothness (ml/min) | 83 to 156 |

The methods used to determine the foregoing properties were as follows:

| | |
|---|---|
| Basis weight: | Tappi T410 os-79 |
| Burst strength: | Tappi T403 os-76 |
| Wet burst: | Cure samples in 105° oven for 5 minutes. Soak in water at 20° C. for 15 minutes. Measure burst as in T403 os-76. |
| Opacity: | Tappi T425 os-75. |
| Wet opacity: | Soak sample in water at 20° C. for 15 minutes. Then proceed as "Opacity". |
| Resistivity (surface): | Cut strips in the machine direction 15 mm × 100 mm. Position between clamp electrodes 70 mm apart. Apply 100 v across the electrodes and measure resistance on a suitable meter. Resistance in Mohm × 2.15 = Resistivity Mohm/sq. |
| Resistivity (volume): | Measure on a Keithley cell set up for volume measurement. Proceed and calculate as per instructions of cell manufacturer. |
| Wet expansion: | Make a pair of marks, 200 mm apart across the sample. Soak for 5 minutes in water at 20° C. Re-measure the distance between the marks and calculate the percentage increase. |
| Bendtsen smoothness: | Tappi UM 535. |

EXAMPLE 2

A furnish was prepared by mixing 200 kg softwood kraft and pulp, 650 kg Eucalyptus pulp. With the fiber was mixed 150 kg titanium dioxide, 5 kg of talc available under the trademark Mistron 775, and 10 liters of sodium aluminate solution, assayed at 19.6 to 21% $Na_2O$, 19.3 to 21.3% $Al_2O_3$. Stock additions of a sizing agent available as Bewesol LT30 (trademark of Akzo Chemie) and were added as a 30% solution at the rate of 10.6 liters per ton of paper. Aluminum sulphate was added in sufficient quantity to control pH to 5.5, which provided an additional source of aluminum ions which assist with retention of rosin size and titanium dioxide. The polyamide/epichlorophydrin copolymer of Example 1 was added at the rate of 118 liters per ton of paper. A polyacrylamide retention aid available as Hydrocol CD3 (trademark of Allied Colloids Ltd.) was added to the furnish in an amount of 700 g/ton followed by a co-retention aid of bentonite, available as Hydrocol HS3 (trademark of Allied Colloids Ltd.) in an amount of 2.5 kg/ton paper.

The furnish web was passed through a size bath at which the conductivizing solution described in Example 1 was applied. Subsequently the fibrous web was then calendared to ensure smoothness.

The tests of opacity, wet burst and wet expansion as described in Example 1 were then conducted on the resulting fibrous web. The results were as follows:

| | |
|---|---|
| Basis weight (g/m²) | 107 to 112.5 |
| Burst strength (kPa) | 167 to 263 |
| Wet burst (kPa) | 49 to 78 |
| Opacity (%) | 91.5 to 93.6 |
| Wet opacity (%) | 82.7 to 86.5 |
| Resistivity surface (MΩ/sq.) | 3.5 to 6.5 |
| Resistivity volume (MΩ-cm) | 193 to 978 |
| Wet expansion (%) | 1.5 to 2.0 |
| Bendtsen smoothness (ml/min) | 36 to 94 |

EXAMPLE 3

A dielectric layer of the following composition

| Chemical | part per 100 |
|---|---|
| ethanol | 7.18 |
| acetone | 23.09 |
| toluene | 37.41 |
| polyvinylbutyral | 6.24 |
| Rohm & Haas E342 acrylic resin | 10.95 |
| polystyrene (Piccolastic A5) | 2.50 |
| calcium carbonate | 11.55 |
| titanium dioxide | .96 |
| optical brightener | .10 |

was coated onto a conductivized base paper having the characteristics of wet burst strength 58, wet expansion 1.5, smoothness 55, and surface resistivity 3.5-5.0 Mohm/sq., 45 inch web.

The lacquer was made by dissolving the polyvinylbutyral, E342 acrylic, and the polystyrene into the ethanol, acetone, and toluene over a period of 15 minutes using a Kady mill. The Kady mill is then used to disperse the calcium carbonate and titanium dioxide over a period of 25 minutes. The optical brightener is also added at this step.

The lacquer was then applied to the conductivized base paper using a roll coater in two equal passes of about 1.0 lb/1000 sf dry.

After converting the web to 44 inches, the product was printed on a Versatec 8944 electrostatic printer at 70% contrast and 48-50% RH. The resulting image had a good density (black: 1.15, cyan: 1.17, magenta 1.07, yellow 0.70) with acceptable grain and defect levels.

The printed image was pasted using a conventional billboard pasting method, i.e., using a conveyor belt, the backside of the sample goes through a nip where the potato paste is applied to the backside of sheet. The paper was left in a closed bucket for two days, and then it was applied to plywood. The paper handled well and did not rip.

The printed image was pasted onto a white sheet of plastic and was subjected to accelerated weathering testing via exposure to XENON are for 375 hours. (Test method ASTM G26, 102 mins. light only; 18 rains light plus spray). The paper stood up well under the testing (slightly wrinkled appearance). Conventional billboard papers put through the same testing showed a much higher degree of paper degradation.

Various samples of the imaged paper were also subjected to paper pasting studies, tabulated below. Each sample was soaked in the paste indicated for one hour, and then the sample was positioned on the substrate being used in the study. The sample boards were brought outside, and the sample visually inspected for failure. Different pastes used in the industry, including starch and synthetic (vinyl) pastes, were used in the study.

| substrate | potato paste | shur-stik 50 (ethylene vinyl acetate) | standard wallpaper paste (vinyl) |
|---|---|---|---|
| plywood | >70 days ok | some buckling after 70 days | |
| tiffin steel | >14 days Ok | >14 days ok | |
| galvanized steel | adhesion failure after within 7 days | >70 days ok | |
| aluminum | >70 days ok | >70 days ok | |
| stainless steel | slight edge peeling after 70 days | >70 days ok | |
| sheetrock | | | >50 days ok |
| plastic | adhesion failure after 64 days (ok after 53 days) | >64 days ok | |
| cement | adhesion ok after being buried in snow (25 days outside) | slight edge peel after being buried in snow (25 days outside) | |

COMPARATIVE EXAMPLE 1

A conductive base having a wet burst strength of 38 was dielectrically coated and imaged as described in Example 3 and pasted using the conventional billboard pasting method described in Example 3. The paper was left in a closed bucket for two days, and then it was applied to plywood. The sample ripped as it was unfolded and applied to the board.

EXAMPLE 4

Sample conductive base papers prepared in Example 1 and Example 2 were coated with a dielectric layer as described in Example 3, printed on a Versatec 8944, prepasted (as described in Example 3), and posted on outdoor billboards using methods standard to the billboard industry.

Both papers handled in a manner similar to standard billboard grades of paper. The billboards remained posted for a minimum of 30 days, with no damage being observed.

EXAMPLE 5

Base paper similar to the conductive base paper made in Example 2, but having been calendared to a Bendtsen smoothness of 32, was coated with lacquer as described in Example 3 in one pass of 1.71 lb/1000 sf dry.

After converting the web to 44", the product was printed on a Versatec 8944 electrostatic printer at 70% contrast and 48-50% RH. The resulting image had good density (black: 1.22, cyan: 1.24, magenta 1.14, yellow 0.71) with acceptable grain and defect levels.

The printed image was pasted using a conventional billboard pasting method, i.e., using a conveyor belt, backside of sample passed through a nip where the potato paste was applied to the backside of sheet. The paper was left in a closed bucked for two days, and then it was applied to plywood. The paper handled well but ripped slightly in one comer when it was applied.

While the invention has been described with preferred embodiments, it is to be understood that variations and modifications may be resorted to as will be apparent to those skilled in the art. Such variations and modifications are to be considered within the purview and the scope of the claims appended hereto.

We claim:

1. An electrographic printing paper suitable for the printing of a quality image having an image density of at least 1.0 for black, comprised of a dielectric coating on a conductive base paper which contains a wet strength agent and exhibits a wet burst strength of at least 50 kPa and a wet expansion of less than about 3%.

2. The electrographic printing paper of claim 1, wherein the conductive base paper contains a sizing or coating of a conductivizing composition comprised of a binder and a substantially water insoluble conductivizing agent.

3. The electrographic paper of claim 2, wherein the wet strength agent is a copolymer of a polyamide and epichlorohydrin.

4. The electrographic paper of claim 2, wherein said paper further contains a filler or opacity agent.

5. The electrographic paper of claim 4, wherein said filler or opacity agent comprises titanium dioxide.

6. The electrographic paper of claim 4, wherein the amount of filler is sufficient to provide a dry opacity of at least 90% and a wet opacity of at least 83%.

7. The electrographic paper of claim 2, wherein the paper is calendered to increase smoothness and decrease porosity of the base paper.

8. The electrographic base paper of claim 2, wherein the substantially water insoluble conductivizing agent comprises an electroconductive powder of synthetic hectorite clay, bentonite, carbon black, graphite, tin oxide, zinc oxide, or antimony oxide.

9. The electrographic paper of claim 8, wherein the substantially water insoluble conductivizing composition is comprised of a synthetic hectorite clay conductivizing agent.

10. The electrographic paper of claim 2, wherein the conductivizing composition is comprised of synthetic hectorite clay as the conductivizing agent, which hectorite clay has had neighborite impurity removed and which has a magnesium silicate layered lattice structure in which magnesium ions are bound in octahedral relationship with hydroxyl ions, some of the magnesium ions being replaced by lithium ions and some of the hydroxyl ions being replaced by fluoride ions, and in which exchangeable cations are disposed between the layers of the layered lattice structure.

11. The electrographic paper of claim 2, wherein the binder in the substantially water insoluble conductivizing composition is selected from the group of an aqueous styrene butadiene latex, an aqueous acrylic polymer emulsion, an aqueous acrylate/styrene copolymer dispersion and an aqueous poly(vinylidene chloride) suspension.

12. The electrographic paper of claim 2, wherein the surface resistivity of the conductivized base paper is between 1–10 Mohm/sq. and a volume resistivity between 90 and 500 Mohm.cm.

13. The electrographic paper of claim 2, wherein the base paper has a basis weight of between 80 and 160 $g/m^2$.

14. The electrographic paper of claim 2, wherein the paper has a wet burst strength of at least 50 kPa, a dry opacity between 90 and 97%, a wet opacity between 83 and 94%, a surface resistivity of between 1 and 10 Mohm/sq., and a volume resistivity between 60 and 600 Mohm.cm.

15. The electrographic paper of claim 2, wherein the dielectric coating is comprised of a dielectric resin and a pigment.

16. The electrographic paper of claim 15, wherein the dielectric resin is comprised of a polyvinylbutyral, polyacrylic, polyester, polycarbonate, polyamide, polyurethane, (meth)acrylic resin, a styrene resin, an olefin resin, or a mixture thereof.

17. The electrographic paper of claim 15, wherein the pigment is selected from clay, calcium carbonate, silica or a synthetic alumina silicate.

18. The electrographic paper of claim 15, wherein the dielectric resin is comprised of polyvinylbutyral, a polyacrylic or a mixture thereof.

19. The electrographic paper of claim 2, wherein the base paper is comprised of synthetic fibers.

20. The electrographic paper of claim 2, containing a developed image thereon.

21. The electrographic paper of claim 20, wherein the size of the medium is suitable for use as an outdoor sign.

22. The electrographic paper of claim 20, wherein the size of the medium is suitable for use as wallpaper.

23. The electrographic paper of claim 20, wherein the size of the medium is suitable for use as an indoor sign.

24. The electrographic paper of claim 1, wherein the paper has a wet burst strength of between 50 kPa and 90 kPa.

25. A process for preparing an outdoor sign containing an image thereon which comprises:

providing the imaged electrographic paper of claim 21, applying paste to the imaged electrographic paper, and applying the imaged electrographic paper to an outdoor structure.

26. The outdoor sign made in accordance with the process of claim 25.

27. A process for preparing wallpaper which comprises:

providing the imaged electrographic paper of claim 22, and applying paste to the backside of the imaged electrographic paper.

28. An electrographic printing paper comprised of a dielectric coating on a conductive base paper, with a conductive base paper containing a wet strength agent and a sizing or coating of a conductivizing composition comprised of a binder and substantially water insoluble conductivizing agent, and with the base paper exhibiting a conductivity of from 1 to 10 Mohm/sq., a wet burst strength of at least 50 kPa, a dry opacity of at least 95% and a wet expansion of less than 3%, and with the paper being suitable for the printing of a quality image having an image density of at least 1.0 for black.

29. The electrographic printing paper of claim 28, wherein the wet expansion is less than 2%.

30. The electrographic printing paper of claim 28 containing an image thereon, wherein the image has an image density of at least 1.0 for black.

31. The imaged electrographic printing paper of claim 30, wherein the image has an image density of at least 1.2 for black.

32. An electrographic printing paper containing an image thereon, wherein the printing paper is comprised of a dielectric coating on a conductive base paper, with the conductive base paper containing a wet strength agent and a sizing or coating of a conductivizing composition comprised of a binder and substantially water insoluble conductivizing agent, and with the base paper exhibiting a wet burst strength of at least 50 kPa, and with the image having an image density of at least 1.0 for black.

33. The imaged electrographic printing paper of claim 32, wherein the image has an image density of at least 1.2 for black.

* * * * *